United States Patent [19]

Spitz et al.

[11] Patent Number: 5,484,754
[45] Date of Patent: * Jan. 16, 1996

[54] PROCESS FOR TREATING A CATALYTIC COMPONENT, RESULTANT COMPONENT, AND POLYMERIZATION OF ETHYLENE USING SUCH COMPONENT

[75] Inventors: Roger Spitz, St Symphorien D'Ozon; Maryse Patin, Villeurbanne; Jean Malinge, Orthez, all of France

[73] Assignee: Elf Atochem, S. A., France

[*] Notice: The portion of the term of this patent subsequent to Aug. 8, 2012, has been disclaimed.

[21] Appl. No.: 6,619

[22] Filed: Jan. 21, 1993

[30] Foreign Application Priority Data

Jan. 27, 1992 [FR] France .................................. 92 00819

[51] Int. Cl.$^6$ .................................................. C08F 4/654
[52] U.S. Cl. .................. 502/169; 502/104; 502/105; 502/107; 502/110; 502/111; 502/113; 502/115; 502/117; 502/125; 502/134; 502/151; 502/224; 502/226; 526/114; 526/119; 526/125; 526/124.4; 526/124.2
[58] Field of Search ........................ 502/107, 113, 502/115, 117, 151, 169, 104, 105, 110, 111, 125, 134, 224, 226; 526/125, 114, 119, 125

[56] References Cited

U.S. PATENT DOCUMENTS

| 4,299,936 | 11/1981 | Candlin et al. .................... 526/119 |
|---|---|---|
| 4,421,674 | 12/1983 | Invernizzi et al. .................... 502/154 |
| 4,537,870 | 8/1985 | Hawley .................... 502/111 |
| 4,562,168 | 12/1985 | Lee .................... 502/107 |
| 4,843,049 | 6/1989 | Invernizzi et al. .................... 502/9 |

FOREIGN PATENT DOCUMENTS

| 0037064 | 5/1990 | European Pat. Off. . |
| 1554710 | 10/1979 | United Kingdom . |

OTHER PUBLICATIONS

Boor, Jr, John, *Ziegler–Natta Catalysts and Polymerizations*, Academic Press, New York, 1979, pp. 602–609.

Primary Examiner—Romulo H. Delmendo
Attorney, Agent, or Firm—John L. Sigalos

[57] ABSTRACT

A process for the polymerization of ethylene or the copolymerization of ethylene with an alpha-olefin, in suspension or in gas phase, in the presence of a catalyst consisting essentially of a cocatalyst and a catalytic component based on at least Mg, Ti and Cl, with the catalytic component being constituted of at least one derivative of magnesium and one chlorinated derivative of titanium in its form III and/or IV, which was subjected, prior to its use, to a reduction treatment and then to treatment with a chlorinated transition metal compound, with the said catalytic component being characterized in that the magnesium derivative is in the form $MgCl_2 \cdot MgO$.

7 Claims, No Drawings

PROCESS FOR TREATING A CATALYTIC COMPONENT, RESULTANT COMPONENT, AND POLYMERIZATION OF ETHYLENE USING SUCH COMPONENT

BACKGROUND OF THE INVENTION

The present invention pertains to a process for the polymerization of ethylene yielding a polymer with a broad distribution of molecular weights and having a considerable proportion of low molecular weights. The invention is particularly applicable to the production of linear high-density and low-density polyethylene. The result is obtained by means of the special treatment of the catalytic component, prior to its use with a cocatalyst in the polymerization of ethylene, and the specificity of the support of the said component.

The invention also pertains to the process for treating the catalytic component.

Polymerization of ethylene is understood to mean not only the homopolymerization of ethylene, but also the copolymerization of ethylene with an alpha-olefin such as propylene, butene-1 or 1-hexene, with the proportion of ethylene not being less than 66% by weight.

According to FR-A2,639,351, prior to use of the catalytic component, constituted of at least one derivative of magnesium, selected from among the compounds of formula $Mg(OR_2)_nCl_{2-n}$, in which $R_2$ is hydrogen or a linear or cyclical hydrocarbon radical and "n" is a number less than or equal to 2, and at least one chlorinated derivative of titanium in its form III and/or IV, it is subjected to reduction by a metal compound with at least one metal-carbon or metal-hydrogen bond, followed by treatment by a halogenated transition metal compound. This treatment of the catalytic component, which is subsequently employed in the catalytic system for the polymerization of ethylene, makes it possible to manufacture polymers with a broad distribution of molecular weights. Nevertheless, the resultant polymer contains less than 10% by weight of molecular weights lower than 10,000.

SUMMARY OF THE INVENTION

In accordance with the present invention, it was found that by subjecting a catalytic component, whose magnesium derivative is $MgCl_2.MgO$ complex, to the aforementioned treatment, a novel component is obtained which when used in the polymerization of ethylene results in a polymer having a broad distribution of molecular weights and also containing at least 10% by weight of polymer chains with molecular weights lower than 10,000.

DETAILED DESCRIPTION

Polymers with broad distribution of molecular weights are used industrially especially in extrusion-blow molding techniques and are distinguished by the polydispersity and their fluidity index from the polymers with narrow distribution of molecular weights which are used industrially especially for injection molding.

Polymers with narrow distribution of molecular weights have on average a polydispersity of circa 4 to 6. Polydispersity is the ratio of the weight-average molecular weight to the number-average molecular weight. These high-fluidity polymers have a fluidity index ratio $MFR_{21-2}$ lower than 35 and a $MFR_{21-5}$ lower than 10. $MFR_{21-2}$ is defined by ASTM Standard D 1238 as the ratio $MI_{21}:MI_2$ of the fluidity index under 21.6 kg to the fluidity index under 2.16 kg. $MFR_{21-5}$ is defined by ASTM Standard D 1238 as the ratio $MI_{21}:MI_5$ of the fluidity index under 21.6 kg to the fluidity index under 5 kg. These products are produced in monoreactors by polymerization of ethylene in suspension, in solution, or in gas phase in the presence of a specific Ziegler type catalyst constituted of a cocatalyst, generally an alkylaluminum, and a catalytic component containing Ti, Mg, Cl and possibly an electron donor. The resultant products with narrow distribution of molecular weights have limited elasticity which eliminates the negative phenomenon of shrinkage upon injection.

Because of their lack of elasticity, such products are unsuitable for techniques requiring noteworthy mechanical resistance in the melted state such as, e.g., in the case of extrusion-blow molding. When these properties are required, use is made of polymers with broad distribution of molecular weights, and preferably, with a fluidity index $MFR_{21-5}$ greater than 16 for a fluidity index $MI_5$ on the order of 1 to 1.5 or a $MI_{21}:MI_2$ ratio greater than 55.

Enormous problems are encountered in the industrial manufacture of these products in monoreactors in the presence of Ziegler type catalysts.

The document by U. Zucchini and G. Cecchin, "Control of Molecular-Weight Distribution in Polyolefins Synthesized with Ziegler-Natta Catalyst Systems" (Adv. Polymer Science, 51, 101–153, 1983) represents the prior art on this issue. According to this document, the best means for producing a polymer with broad distribution of molecular weights in the presence of a Ziegler catalyst is to perform polymerization in multiple steps or in cascade from at least two successive reactors. Nevertheless, even under the best conditions, it is not easy to produce a polyethylene with $MFR_{21-5}$ value greater than 16 since a necessary condition is to work with catalysts yielding broad distributions of molecular weights in a monoreactor. In addition, this procedure has the drawback of requiring at least two reactors which means a loss of productivity in relation to the size of the installation and sensitive controls because of the activity of more than one reactor.

According to FR-A-2,596,398, it is possible to produce, by polymerization of ethylene in a monoreactor, a polymer with broad distribution of molecular weights with a $MI_{21}:MI_5$ MFR value greater than 16. This result is attained by using as the catalytic component a mixture of $MgCl_2$ and $TiCl_4$ produced by milling them together. In addition to the milling of the components which requires complex industrial controls, the procedure has the drawback of employing a component of poorly defined structure, which results in the production with hetrogeneous granular distribution.

The advantage of the procedure in accordance with the present invention is the use of a catalytic component of controlled structure which makes it possible to produce polymer with a broad distribution of molecular weights, with the ratio $MI_{21}:MI_5$ being greater than 16, and possibly exceeding 25 of high molecular weight products, particularly for products with a fluidity index $MI_2$ lower than 0.5, and with the ratio $MI_{21}MI_2$ being higher than 55. The second advantage of the procedure is the use of a catalytic component making possible the production of polymer with at least 10% by weight, preferably less than 20% by weight, of polymer chains with molecular weights lower than 10,000.

The presence of these low molecular weights in noteworthy amounts has the advantage of making the polymer extremely easy to use.

In order to obtain these results, the ethylene is polymerized in the presence of a catalyst constituted of a cocatalyst selected generally from among the alkylaluminums and of a catalytic component based on at least Mg, Ti and Cl, with the catalytic component having previously been subjected to a reduction treatment in a first step and then in a second step to a treatment by a chlorinated transition metal compound, characterized by the fact that Mg of the component is initially in the form $MgCl_2 \cdot MgO$.

The component is prepared using known means and is the result of the combination of at least one titanium compound and a support containing magnesium. In addition to the subsequent treatments of the component, the characterizing feature of the invention is that the support is $MgCl_2 \cdot MgO$ compound.

The titanium compound is usually selected from among the chlorinated titanium compounds of formula $Ti(OR)_xCl_{4-x}$ in which:

R is an aliphatic or aromatic $C_1$ to $C_{14}$ hydrocarbon radical, or $COR^1$ in which $R^1$ is an aliphatic or aromatic $C_1$ to $C_{14}$ hydrocarbon radical, and x is a number from 0 to 4.

The $MgCl_2 \cdot MgO$ which can be used preferably contains from 10 to 50% by weight, more preferably from 15 to 40% by weight, of MgO for 90 to 50% by weight, more preferably from 85 to 60% by weight, of $MgCl_2$.

The $MgCl_2 \cdot MgO$ used for the support of the catalytic component can be obtained by any known means. However, in accordance with the invention it is recommended to use $MgCl_2 \cdot MgO$ produced by bringing hydrated $MgCl_2$ into contact with an alcohol, followed by heat treatment after partial elimination of the alcohol, the contact being characterized by suspending hydrated $MgCl_2$ in the alcohol with the molar ratio of the alcohol to the hydrated $MgCl_2$ being lower than the ratio of solubility of the substances at the temperature of the suspension. In accordance with the procedure, it is indispensable that the $MgCl_2$ remain in suspension in the $MgCl_2$-supersaturated alcohol. Under these conditions, it is preferable that the medium remain biphasic and that it contain a sufficient amount of alcohol so as to maintain the $MgCl_2$ in suspension.

The alcohol suitable for the procedure is selected from among the straight or branched chain monoalcohols with 4 to 16 carbons.

Under the recommended operating conditions, the suspension is effected in the conventional manner by bringing the alcohol into contact, preferably under agitation, with hydrated $MgCl_2$ of any structure. The $MgCl_2$ is maintained in suspension for the amount of time, generally more than 3 hours, required for the complete swelling of the particles in the alcohol. So as to obtain the best results, it is recommended to operate during the entire implementation of the procedure essentially at a temperature from 0° to 150° C., preferably from 60° to 120° C., since, as was previously stated, the $MgCl_2$ must remain in suspension in the supersaturated alcohol.

After completion of this particle rearrangement operation, the hydrated $MgCl_2$ particles in suspension are separated from the $MgCl_2$-saturated alcohol, preferably washed, e.g., with a hydrocarbon, and preferably dried before being heat treated at a temperature generally between 300° C. and 600° C. so as to form $MgCl_2$ MgO without destroying the granulometric rearrangement. The drying treatment is usually performed under vacuum or on a fluidized bed in a previously dried inert gas medium.

The resultant $MgCl_2 \cdot MgO$ usually contains from 15 to 40% by weight of MgO. The mean size of the $MgCl_2 \cdot MgO$ particles is generally from 5 to 200 μm, preferably from 10° to 120 μm, for a narrow granulometric distribution. The breadth of the granulometric distribution, expressed as D90/D10, is usually lower than 9 and generally lower than 7.

D90 is the diameter below which are 90% by mass of the particle diameters and D10 is the diameter below which are 10% by mass of the particle diameters.

The initial hydrated $MgCl_2$ is $MgCl_2 \cdot xHOH$, with $0.3 \leq x \leq 12$. This hydrated $MgCl_2$ is usually a commercial $MgCl_2 \cdot 6HOH$ or is obtained by hydrating or dehydrating this commercial $MgCl_2 \cdot 6HOH$.

The $MgCl_2 \cdot MgO$ can also be produced directly by heat treatment in an inert medium of $MgCl_2 \cdot xHOH$ with $1 \leq x \leq 12$ at a temperature between 300° and 600° C., with the resultant product being activated, e.g., by milling, preferably in the presence of a lubricant such as durene or adamantane.

It is possible to associate the essential elements of the catalytic component all other compounds which can be used in this type of component such as chlorinated compounds, electron donors and electron acceptors.

The source of chlorine can be the titanium halide and/or magnesium halide directly but it can also be an independent chlorinating agent such as hydrochloric acid or an organic halide such as butyl chloride.

The electron donor or electron acceptor is a liquid or solid organic compound known to enter into the composition of these catalytic components. The electron donor can be a mono- or polyfunctional compound advantageously selected from among the aliphatic or aromatic carboxylic acids and their alkyl esters, the aliphatic or cyclic ethers, the ketones, the vinyl esters, the acrylic derivatives, particularly alkyl acrylates or alkyl methacrylates and the silanes. Especially suitable as electron donors are compounds such a methyl paratoluate, ethyl benzoate, ethyl acetate, butyl acetate, ethyl ether, ethyl para-anisate, dibutyl phthalate, dioctyl phthalate, diisobutyl phthalate, tetrahydrofuran, dioxane, acetone, methyl isobutyl ketone, vinyl acetate, methyl methacrylate and the silanes such as phenyltriethoxysilane and the aromatic or aliphatic alkoxysilanes.

The electron acceptor is a Lewis acid, selected preferably from among the aluminum chlorides, boron trifluoride, chloranil or the alkylaluminums or alkylmagnesiums.

The catalytic component is in the form of a complex among at least Mg, Ti and Cl, with the titanium being in the chlorinated $Ti^{IV}$ or $Ti^{III}$ form or a mixture of the two, with possibly an electron donor or electron acceptor. The catalytic component can be in complex form as such but it can also be in the form of a doubly supported deposit on a second mineral support such as $SiO_2$ or $Al_2O_3$ or an organic support, e.g., of the polymer type.

The catalytic component as defined above is treated by a reducing agent in a first step. The reducing agent can be a gas, liquid, hydrocarbon-soluble compound which is capable, in a manner which is generally known in chemistry, to diminish the degree of oxidation of the $Ti^{IV}$ and/or $Ti^{III}$. The reducing agent employed is preferably a metallic compound with at least one metal-carbon or metal-hydrogen bond. The metallic compounds with at least one metal-carbon bond are usually selected from the $MQ_zCl_{z-y}$ compounds in which M is a metal from groups I, II or III of the Periodic Table, more specifically Al or Mg, Q is a linear or cyclical hydrocarbon radical "z" is a number corresponding to the maximum valence of the metal and "y" is a number less than or equal to "z". Also included in the definition of these compounds are the addition products of these compounds between each other, e.g., $NaAl(C_2H_5)_4$ or the products obtained by bridging with an oxygen two metallic compounds as previously defined, e.g., the alumoxanes or aluminosiloxanes. Among these metallic compounds, preference is given to the alumoxanes, the aluminosiloxanes, the dialkylmagnesiums and the alkylaluminums of the type $Al(R^3)_cX_d$ in which:

X is Cl, and $R^3$ represents a $C_1$ to $C_{14}$ saturated hydrocarbon radical, or $(OR^4)$ in which $R^4$ is a $C_1$ to $C_{14}$ saturated hydrocarbon radical with $0 \leq d \leq 1.5$ and $c+d=3$.

The following can be cited as examples: $Al(C_2H_5)_3$, $Al(C_2H_5)_2Cl$, $Al(C_4H_9)_3$, $Al_2(C_2H_5)_3Cl_3$, $Al(C_6H_{13})_3$, $Al(C_8H_{17})_3$, and $Al(C_2H_5)_2(OC_2H_5)$.

The metallic compounds with at least one metal-hydrogen bond are usually selected from among the compounds of formula $MQ'_cX_dH_e$ in which M is a metal as previously defined, Q' is a linear or cyclical hydrocarbon radical, X is Cl or is selected from among the previous Q' radicals with $0<d<1.5$, $1<e<z$ and $c+d+e=z$, with z corresponding to the maximum valence of M. Among these compounds can be cited the hydrides such as $Al(C_4H_9)_2H$, $Al(C_2H_5)_2H$ and $(C_2H_5)_4B_2H_2$ and the mixed hydrides such as aluminum-lithium, $AlLiH_4$. Obviously, the hydrides can be combined with each other or with the previously defined organometallic compounds.

In this step, the compound is treated under an inert atmosphere by the reducing agent alone or in the presence of a diluent which is both a solvent of the reducing agent and inert in relation to both the reducing agent and the component. Among other substances, the hydrocarbons are suitable for this application. The reaction temperature is not critical but in order that the duration of the reaction be of reasonable length the reduction is preferably performed between room temperature and 150° C. under atmospheric pressure or under pressure, more preferably between 40° and 100° C. under atmospheric pressure, for a duration of reaction on the order of 10 minutes to 24 hours.

The reduction reaction is stopped when at least 50% by weight of the initial titanium has its degree of oxidation reduced by at least one unit, e.g., when 50% of the $Ti^{IV}$ is reduced to $Ti^{III}$ or from $Ti^{III}$ to $Ti^{II}$. However, it is preferable to allow the reduction of the titanium to continue as far as possible; thus it is recommended to stop the reduction when the mean degree of reduction of the titanium is as close to II as possible. In this reduction step, the molar ratio reducing metal:titanium is preferably greater than 2, more preferably between 10 and 50.

The reduction reaction is stopped by cooling and washing the resultant product, preferably with a hydrocarbon, so as to eliminate the excess reducing agent. The resultant product is preferably dried.

In the second step, the reduced product is treated with a chlorinated transition metal compound. This chlorinated compound is most usually a chloride, alkoxychloride or oxychloride of a transition metal selected from among titanium, vanadium, chromium or zirconium, e.g., $TiCl_4$ or $VCl_4$. In order to facilitate the chlorination reaction, it is preferable to use a liquid chlorinated compound or a compound which is soluble in a solvent which is inert in relation to the products brought into contact. The treatment is carried out by bringing into contact in an inert atmosphere the reduced product from the first step and the chlorinated compound. Here again, the temperature of the reaction is not critical. For practical reasons, it is recommended to treat the products in contact at a temperature between room temperature and 150° C., preferably between 60° and 100° C., for durations of treatment between several minutes and 4 hours. The amount of chlorinated transition metal compound employed is preferably at least one half of the stoichiometric amount, preferably close to the stoichiometric amount or in excess relation to the titanium content of the product produced at the end of the first step. After treatment, the component is finally recovered under an inert atmosphere after being washed and preferably dried.

The catalytic component produced after these two treatment steps is used in a conventional manner with a generally known cocatalyst, generally selected from among the alkylaluminums, in suspension or gas-phase olefin polymerization procedures.

In ethylene suspension polymerization procedures, operations are generally carried out in a hydrocarbon liquid medium at temperatures up to 120° C. and under pressures up to 250 bars.

Gas-phase polymerization of ethylene, in the presence of hydrogen and an inert gas, is performed in any gas-phase polymerization reactor, especially in an agitated or fluidized bed reactor. The operating conditions are known from the prior art. Operations are generally carried out at a temperature below the melting point (MP) of the polymer or copolymer to be synthesized, more specifically between 20° C. and (MP-5)°C. under a pressure such that the ethylene and the other hydrocarbon monomers possible present in the reactor are essentially in vapor phase.

Polymerization can be performed in two steps. In the first step, it is possible to consolidate the catalytic system by performing prepolymerization based on ethylene in the presence of the constituents of the catalytic system and a cocatalyst. Then, in the second step, polymerization is performed with addition of ethylene or a mixture of ethylene and an alpha-olefin as previously described. The prepolymerization step represents formation of polymer not exceeding 10% by weight of the total polymer to be formed. This prepolymerization step is executed in suspension in the presence of a hydrocarbon diluent, in gas phase, or in combination of suspension and gas phase.

The following nonlimitative examples illustrate the invention.

In the following examples, determination of the molecular weights is performed by GPC (gel permeation chromatography or steric exclusion chromatography). The polymer is dissolved in trichlorobenzene at 135° C. at a concentration of 1%, then filtered and injected into a set of TSK columns at a temperature of 145° C. at a flow rate of a mL/minute. The injected volume is 410 mL.

EXAMPLE 1

49 g of $(MgCl_2.6HOH)$ are treated under a vacuum of 2 pascals at 500° C. for 2 hours. The rate of temperature increase is 10° C./minute. 18.4 g of solid A containing 35% by weight of MgO are obtained.

9.8 g of solid A are milled for 8 hours with 0.4 g of adamantane. The solid recovered from the milling bowl with heptane is washed three times with 100 mL of heptane.

After washing, the solid is brought into contact with 40 mL of $TiCl_4$ at 80° C. for 2.5 hours. After three washings with 100 mL of heptane, the resultant solid B is dried under vacuum.

2.3 g of dried solid B are treated in heptane with 5 mL of triethylaluminum at a concentration of 0.9 mol/liter, with the Al:Ti ratio being circa 33, for 3 hours at 80° C. The resultant solid is rinsed three times, protected from air, with 100 mL of heptane. The resultant product is brought into contact with 0.16 mL or TiCl$_4$ for 3 hours at 70° C. After 3 washings with heptane, the resultant solid is dried under vacuum. This yields a catalytic component solid C containing 2.9% by weight of titanium.

Catalytic component C is employed in suspension polymerization of ethylene. The following are introduced successively at room temperature under an inert atmosphere into a stainless steel one-liter reactor equipped with blade agitation operating at 750 rpm: 500 mL of heptane, 3 mM of triisobutylaluminum and 28 mg of catalytic component C.

Hydrogen is added until a partial pressure of 3.6 bars is attained in the reactor. Ethylene is added while adjusting the pressure to reach 8 bars absolute of total pressure after heating to 80° C. This total pressure is maintained constant for 1 hour by addition of ethylene.

After one hour, injection of ethylene is stopped. After cooling to room temperature, the catalyst is deactivated by addition of a solution of methanol slightly acidified by 10% HCl. The polymer suspension is filtered and then dried.

The following results were obtained:

$MI_5=0.9$ $MI_{21}=16.6$ $MI_{21}:MI_5=18.4$ $MI_{21}:MI_2=87.3$

Molecular weights<10,000=13.5% by weight

EXAMPLE 2

2.1 g of dried solid B are treated in heptane with 4.4 mL of triethylaluminum at a concentration of 1.28 mol/L (Al:Ti= 35.4) for 3 hours at 70° C. The resultant solid is rinsed three times, protected from air, with 100 mL of heptane. The resultant product is brought into contact with 10 mL of pure TiCl$_4$ for 2 hours at 75° C. After three washings with heptane, the resultant solid is dried under vacuum. This yields a catalytic component D containing 4.9% by weight of titanium.

Catalytic component D is used in suspension polymerization under the conditions of Example 1 with 3.7 bars (test 1) and 4 bars (test 2) of hydrogen.

For purposes of comparison, test 2 is repeated with a catalytic component produced in accordance with Example 2, component E, of FR-A-2,639,351.

The results are shown in the table below.

| Test | $MI_5$ | $MI_{21}$ | $MI_{21}:MI_5$ | $MI_{21}:MI_2$ | Molecular weights <10,000 |
|---|---|---|---|---|---|
| 1 | 0.55 | 12.8 | 22.3 | 128.0 | 15.3% by weight |
| 2 | 1.9 | 33.4 | 17.6 | 83.4 | 17.2% by weight |
| 2 (comparative) | 0.6 | 13.0 | 21.7 | 100.3 | 7.4% by weight |

EXAMPLE 3

19.2 g of (MgCl$_2$.6HOH) are treated under a vacuum of 2 pascals at 500° C. for 2 hours. The rate of temperature increase is 5° C./minute for 20 minutes and then 10° C./minute. This yields 7.2 g of solid E containing 35% by weight of MgO.

6.5 g of solid E are milled for 8 hours with 0.33 g of adamantane. The recovered solid is extracted from the milling bowl with heptane, washed three times with 100 mL of heptane and dried under vacuum.

The resultant solid is then brought into contact with 40 mL of TiCl$_4$ at 70° C. for 2 hours. After three washings with 100 mL of heptane, this solid F is dried under vacuum.

1.5 g of solid F are treated in heptane with 5 mL of triethylaluminum at a concentration of 1.3 mol/L (Al:Ti= 24.6) for 2 hours at 65° C. The resultant solid is rinsed three times, protected from air, with 100 mL of heptane. The resultant product is brought into contact with 10 mL of TiCl$_4$ for 2 hours at 80° C. The resultant solid is dried under vacuum. This yields a catalytic component G containing 7.4% by weight of titanium.

Catalytic component G is used for suspension polymerization under the conditions of Example 1 but with trihexylaluminum and 3.4 bars of hydrogen.

For purposes of comparison, the test is repeated with a catalytic component produced in accordance with Example 2, component D, of FR-A-2,639,351.

The following results were obtained:

| Test | $MI_5$ | $MI_{21}$ | $MI_{21}:MI_5$ | $MI_{21}:MI_2$ | Molecular weights <10,000 |
|---|---|---|---|---|---|
| G | 0.77 | 16.3 | 21.2 | 116.4 | 18.8% by weight |
| Comparative | 0.77 | 18.0 | 23.4 | 120.7 | 7.9% by weight |

EXAMPLE 4

Under argon, 70.2 g of (MgCl$_2$.6HOH) are brought into contact with 52 mL of 2-ethylhexanol. The entirety is brought to 95° C. under agitation for 6 hours. The solvent is eliminated by decanting and siphoning. The solid is washed four times, protected from air, with 100 mL of heptane and dried under vacuum from room temperature to 120° C.

This solid is subjected to the following heat treatment under a vacuum of 2 pascals:

(i) temperature raised to 120° C. at the rate of 10° C./minute, (ii) temperature raised to 350° C. at the rate of 6° C./minute and held at 350° C. for 2 hours, and (iii) temperature raised to 450° C. at the rate of 10° C./minute and held at 450° for 30 minutes.

This yields 28.2 g solid H, MgCl$_2$.MgO containing 25% by weight of MgO.

The resultant solid H is then brought into contact with 80 mL of TiCl$_4$ at 85° C. for 1 hour. After three washings with 100 mL heptane, this solid I is dried under vacuum.

1.0 g of solid I is treated in heptane with 16 mL of triethylaluminum at a concentration of 1.1 mol/L (Al:Ti= 32.4) for 6 hours at 80° C. The resultant solid is rinsed four times, protected from air, with 100 mL of heptane. The resultant product is brought into contact with 5 mL of TiCl$_4$ for 2 hours at 80° C. After three washings with heptane, the resultant solid is dried under vacuum. This yields a catalytic component J containing 1.2% by weight of titanium.

Catalytic component J is used in suspension polymerization under the conditions of Example 1 with 3.0 bars of hydrogen.

The following results were obtained:

$MI_5 = 0.66$ $MI_{21} = 10.2$ $MI_{21}:MI_5 = 15.4$ $MI_{21}:MI_2 = 70.1$

Molecular weights<10,000=10.6% by weight

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A process for preparing a catalytic component useful for the polymerization of ethylene to form a polymer having a broad distribution of molecular weight and containing at least by weight of polymer chains with a molecular weight lower than 10,000, comprising forming said component by combining a support comprising $MgCl_2 \cdot MgO$ and a chlorinated derivative of titanium in its form III and/or IV, followed by a reduction treatment using a compound capable of reducing the degree of oxidation of the titanium for a time sufficient to reduce the degree of oxidation of at least 50% by weight of the titanium by at least one unit and then subjecting the reduced product to treatment with a chlorinated transition metal compound.

2. The process of claim 1 wherein the support consists of 10 to 50% by weight of MgO and the balance of $MgCl_2$.

3. The process of claim 1 wherein the $MgCl_2 \cdot MgO$ is produced by contacting hydrated $MgCl_2$ of the formula $MgCl_2 \cdot xHOH$ in which $0.3 \leq x \leq 12$ with an alcohol followed by heat treatment after partial elimination of alcohol, with the molar ratio alcohol:hydrated $MgCl_2$ being that required to maintain the $MgCl_2$ in suspension in a $MgCl_2$-supersaturated alcohol at the temperature of the suspension.

4. The process of claim 2 wherein the $MgCl_2 \cdot MgO$ is produced by contacting hydrated $MgCl_2$ of the formula $MgCl_2 \cdot xHOH$ in which $0.3 \leq x \leq 12$ with an alcohol followed by heat treatment after partial elimination of alcohol, with the molar ratio alcohol:hydrated $MgCl_2$ being that required to maintain the $MgCl_2$ in suspension in a $MgCl_2$-supersaturated alcohol at the temperature of the suspension.

5. The process of claim 1, wherein the $MgCl_2 \cdot MgO$ is produced by heat treatment in an inert medium of $MgCl_2 \cdot xHOH$, in which $1<x<12$, at a temperature between 300° and 600° and with the resultant $MgCl_2 \cdot MgO$ being activated by milling.

6. The process of claim 2, wherein the $MgCl_2 \cdot MgO$ is produced by heat treatment in an inert medium of $MgCl_2 xHOH$, in which $1<x<12$, at a temperature between 300° and 600° and with the resultant $MgCl_2 \cdot MgO$ being activated by milling.

7. A catalytic component produced by the process of any one of claims 1 to 6.

* * * * *

UNITED STATES PATENT AND TRADEMARK OFFICE
CERTIFICATE OF CORRECTION

PATENT NO. : 5,484,754
DATED : January 16, 1996
INVENTOR(S) : Roger Spitz; Maryse Patin; Jean Malinge It is certified that error appears in the above-indentified patent and that said Letters Patent is hereby corrected as shown below:

Col. 9, line 18, after "least" insert --10%--.

Signed and Sealed this

Twenty-third Day of April, 1996

Attest:

BRUCE LEHMAN

*Attesting Officer*     Commissioner of Patents and Trademarks